United States Patent
Hillan (10) Patent No.: US 8,923,761 B2
(45) Date of Patent: Dec. 30, 2014

(54) METHODS AND APPARATUS FOR IMPROVING NFC RF DISCOVERY LOOP TUNING BASED ON DEVICE SENSOR MEASUREMENTS

(75) Inventor: John Hillan, Farnsborough (GB)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 13/473,927

(22) Filed: May 17, 2012

(65) Prior Publication Data

US 2013/0309965 A1 Nov. 21, 2013

(51) Int. Cl.
*H04B 5/00* (2006.01)
*H04W 12/06* (2009.01)

(52) U.S. Cl.
CPC *H04W 12/06* (2013.01); *H04B 5/00* (2013.01)
USPC ......... 455/41.1; 235/492; 235/451; 340/10.4; 428/41.3; 428/212

(58) Field of Classification Search
CPC ..... H04W 4/008; H04W 8/005; H04W 48/16; H04W 12/06; H04B 5/00
USPC ................. 455/41.1, 41.2, 435.2, 435.3, 512, 455/67.11, 405; 235/492, 451; 428/41.3, 428/212; 340/10.4
See application file for complete search history.

(56) References Cited

U.S. PATENT DOCUMENTS

| | | | |
|---|---|---|---|
| 7,493,082 B2 * | 2/2009 | Perttila ........................ | 455/41.2 |
| 7,652,578 B2 | 1/2010 | Braun et al. | |
| 7,680,520 B2 | 3/2010 | Ruuska et al. | |
| 7,711,323 B2 | 5/2010 | Fujii | |
| 7,729,689 B2 | 6/2010 | Chakraborty et al. | |
| 7,734,307 B2 * | 6/2010 | Dawidowsky ................ | 455/522 |
| 7,738,494 B2 * | 6/2010 | Takayama ..................... | 370/475 |
| 7,742,744 B2 | 6/2010 | Twitchell, Jr. | |
| 7,849,139 B2 | 12/2010 | Wolfson et al. | |
| 7,882,541 B2 | 2/2011 | Yasaki et al. | |
| 7,929,910 B2 | 4/2011 | Chen | |
| 7,949,358 B2 * | 5/2011 | Wentink et al. ............... | 455/515 |
| 7,980,469 B2 * | 7/2011 | Matsuo ......................... | 235/451 |

(Continued)

FOREIGN PATENT DOCUMENTS

| | | |
|---|---|---|
| EP | 1653632 A1 | 5/2006 |
| EP | 2112634 A1 | 10/2009 |

(Continued)

OTHER PUBLICATIONS

International Search Report and Written Opinion—PCT/US2013/041136—ISA/EPO—Oct. 30, 2013.

(Continued)

*Primary Examiner* — Marceau Milord
(74) *Attorney, Agent, or Firm* — Charles E. Eggers (57) ABSTRACT

Aspects disclosed herein relate to providing improved selection of a near field communication (NFC) radio frequency (RF) discovery loop based on one or more measurements obtained from one or more sensors associated with a NFC device. In the disclosed aspects, a NFC device may be equipped to obtain an informational value for a device based on a measurement obtained from one or more device sensors. The NFC device may be further equipped to select a RF discovery loop based on the obtained informational value. The NFC device may be further operable to perform RF discovery using the selected RF discovery loop.

60 Claims, 7 Drawing Sheets

(56) References Cited

U.S. PATENT DOCUMENTS

| | | | |
|---|---|---|---|
| 8,018,344 B2 | 9/2011 | Chang et al. | |
| 8,060,012 B2 | 11/2011 | Sklovsky et al. | |
| 8,068,011 B1 * | 11/2011 | Sajadi et al. | 340/10.4 |
| 8,112,066 B2 | 2/2012 | Ben | |
| 8,116,680 B2 | 2/2012 | Bloebaum et al. | |
| 8,140,053 B2 * | 3/2012 | Jatschka et al. | 455/410 |
| 8,199,766 B2 * | 6/2012 | Li et al. | 370/431 |
| 8,224,243 B2 * | 7/2012 | Takayama et al. | 455/41.1 |
| 8,240,568 B2 * | 8/2012 | Matsuo | 235/451 |
| 8,290,480 B2 | 10/2012 | Abramson et al. | |
| 8,335,937 B2 * | 12/2012 | Qi et al. | 713/320 |
| 8,395,478 B2 * | 3/2013 | Diab et al. | 340/5.81 |
| 8,401,596 B2 * | 3/2013 | Takayama | 455/574 |
| 8,433,375 B2 | 4/2013 | Yamazaki et al. | |
| 8,537,907 B2 * | 9/2013 | Sung | 375/259 |
| 8,676,277 B2 * | 3/2014 | Takayama | 455/574 |
| 2005/0077356 A1 | 4/2005 | Takayama et al. | |
| 2006/0142034 A1 | 6/2006 | Wentink et al. | |
| 2006/0286937 A1 | 12/2006 | Russell et al. | |
| 2008/0224825 A1 | 9/2008 | Nystrom et al. | |
| 2009/0209223 A1 | 8/2009 | Kone et al. | |
| 2009/0247077 A1 | 10/2009 | Sklovsky et al. | |
| 2010/0136908 A1 | 6/2010 | Hwang et al. | |
| 2010/0144269 A1 | 6/2010 | Do et al. | |
| 2010/0213895 A1 | 8/2010 | Keating et al. | |
| 2010/0279606 A1 | 11/2010 | Hillan et al. | |
| 2010/0311326 A1 | 12/2010 | Klabunde et al. | |
| 2011/0022755 A1 | 1/2011 | Sueyoshi et al. | |
| 2011/0161697 A1 | 6/2011 | Qi et al. | |
| 2011/0226853 A1 | 9/2011 | Soh et al. | |
| 2011/0312279 A1 | 12/2011 | Tsai et al. | |
| 2012/0045989 A1 | 2/2012 | Suumaeki et al. | |
| 2012/0309302 A1 * | 12/2012 | Buhot | 455/41.1 |
| 2013/0036050 A1 * | 2/2013 | Giordano et al. | 705/44 |
| 2013/0143487 A1 | 6/2013 | Hillan | |
| 2013/0203349 A1 | 8/2013 | Hillan et al. | |
| 2013/0281013 A1 | 10/2013 | Hillan | |

FOREIGN PATENT DOCUMENTS

| | | |
|---|---|---|
| GB | 2328588 A | 2/1999 |
| JP | 2005018166 A | 1/2005 |
| WO | WO2007102115 A1 | 9/2007 |
| WO | 2009009545 A2 | 1/2009 |
| WO | 2011041383 A1 | 4/2011 |

OTHER PUBLICATIONS

Santosh Abraham (Qualcomm Inc): "Efficient Device and Service Discovery for Peer-to-Peer (P2P) scenarios; 11-11-1517-00-0wng-efficient-device-and-service-di scovery-for-peer-to-peer-p2p-scenarios", IEEE SA Mentor; 11-11-1517-00-OWNG-Efficient-Device-and-Service-Discovery-For-Peer-To-Peer-P2P-Scena rios, IEEE-SA Mentor, Piscataway, NJ USA, vol. 802.11 WNG, Nov. 7, 2011, pp. 1-15, XP068037853, [retrieved on Nov. 7, 2011] p. 9.

* cited by examiner

METHODS AND APPARATUS FOR
IMPROVING NFC RF DISCOVERY LOOP
TUNING BASED ON DEVICE SENSOR
MEASUREMENTS

BACKGROUND

1. Field

The disclosed aspects relate generally to communications between and/or within devices and specifically to methods and systems for improving selection of a near field communication (NFC) radio frequency (RF) discovery loop based on one or more measurements obtained from one or more sensors associated with a NFC device.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, NFC, etc.

Current NFC Forum specifications describe a RF discovery loop that, once enabled, alternates between states in which an NFC device is in a polling mode and in a listening mode. The NFC Device Host (DH) is responsible for configuring parameters that control RF discovery. Such parameters include control of the number of times different RF technologies are polled for, and a portion of the remaining time during which the NFC device listens for remote polling devices. In the current NFC Forum NCI specification, once NFC is activated on a device, the DH will configure then start RF discovery, and that this will be continue to be the case until the user turns off NFC (other than any periods during which it is connected to a remote NFC endpoint). This process requires a designer to choose between higher power consumption and longer delays in establishing NFC connections, either of which diminishes a user's experience. The current NFC Forum NCI specification does not provide any mechanism by which a NFC enabled device may tune the RF discovery process to improve user experience.

Thus, improved apparatus and methods for improving selection of a near field communication (NFC) radio frequency (RF) discovery loop based on one or more measurements obtained from one or more sensors associated with a NFC device may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing improved selection of a NFC RF discovery loop based on one or more measurements obtained from one or more sensors associated with a NFC device. In one example, a NFC device may be equipped to obtain an informational value for a device based on a measurement obtained from one or more device sensors. The NFC device may be further equipped to select a RF discovery loop based on the obtained informational value. The NFC device may be further operable to perform RF discovery using the selected RF discovery loop.

According to related aspects, a method for providing selection of a NFC RF discovery loop based on one or more measurements obtained from one or more sensors associated with a NFC device is provided. The method can include obtaining an informational value for a device based on a measurement obtained from one or more device sensors. Further, the method may include selecting a RF discovery loop based on the obtained informational value. Moreover, the method can include performing RF discovery using the selected RF discovery loop.

Another aspect relates to a communications apparatus. The wireless communications apparatus can include means for obtaining an informational value for a device based on a measurement obtained from one or more device sensors. Further, the communications apparatus can include means for selecting a RF discovery loop based on the obtained informational value. Moreover, the communications apparatus can include means for performing RF discovery using the selected RF discovery loop.

Another aspect relates to a communications apparatus. The apparatus can include a RF discovery loop selection module configured to obtain an informational value for a device based on a measurement obtained from one or more device sensors. Further, the RF discovery loop selection module may be configured to select a RF discovery loop based on the obtained informational value. Moreover, the RF discovery loop selection module may be configured to perform RF discovery using the selected RF discovery loop.

Another aspect relates to a computer program product, which can have a computer-readable medium comprising code for obtaining an informational value for a device based on a measurement obtained from one or more device sensors. Further, the computer-readable medium can include code for selecting a RF discovery loop based on the obtained informational value. Moreover, the computer-readable medium can include code for performing RF discovery using the selected RF discovery loop.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a device may recognize a NFC target device and/or tag when within range of the coverage area of the NFC device and/or tag. Thereafter, the device may obtain sufficient information to allow for communications to be established. One form of communications that may be established is a peer-to-peer communications link (e.g., a NFC-DEP based communications link). As described herein, communications between the devices may be enabled over a variety of NFC RF technologies, such as but not limited to, NFC-A, NFC-B, NFC-F, etc. Different remote NFC devices may use different NFC RF technologies and may be operable in different NFC environments. Different RF discovery loops may be used to improve efficient connections while taking into account device power consumption. The NFC device may select which RF discovery loop to use based on contextual information obtained from one or more device sensors.

Figure 1:
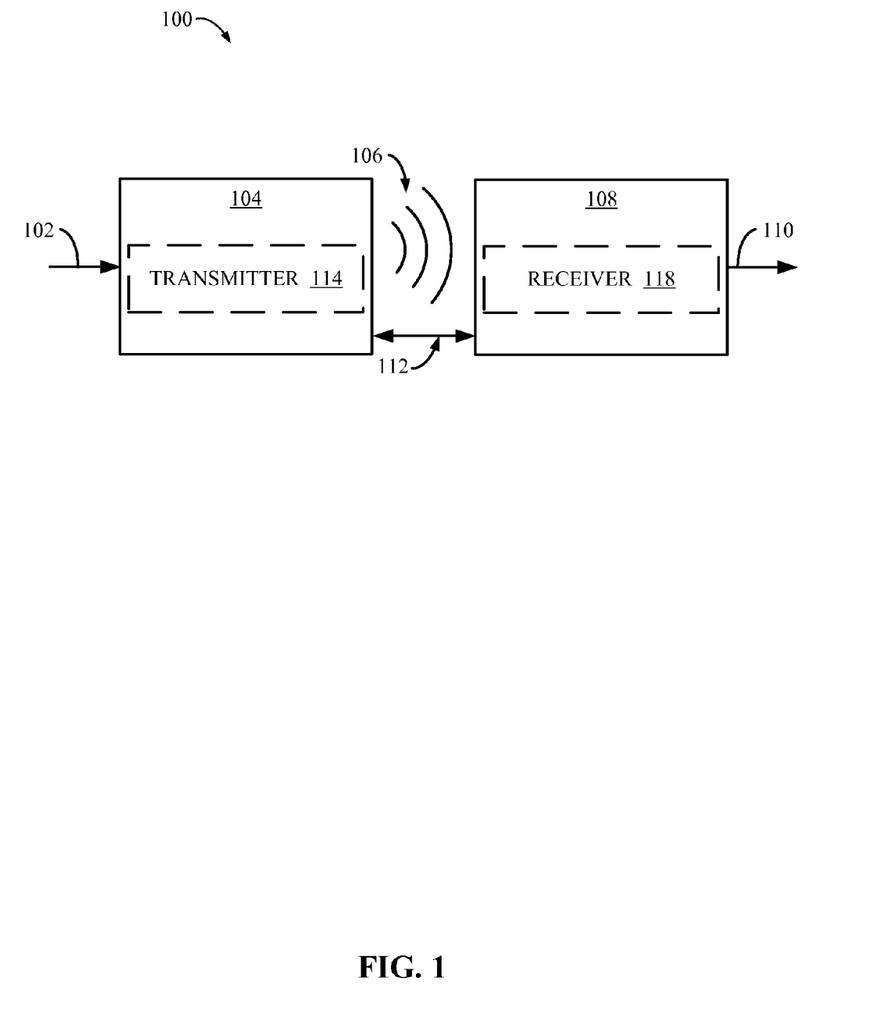
FIG. 1 illustrates a simplified block diagram of a near field wireless communication system according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
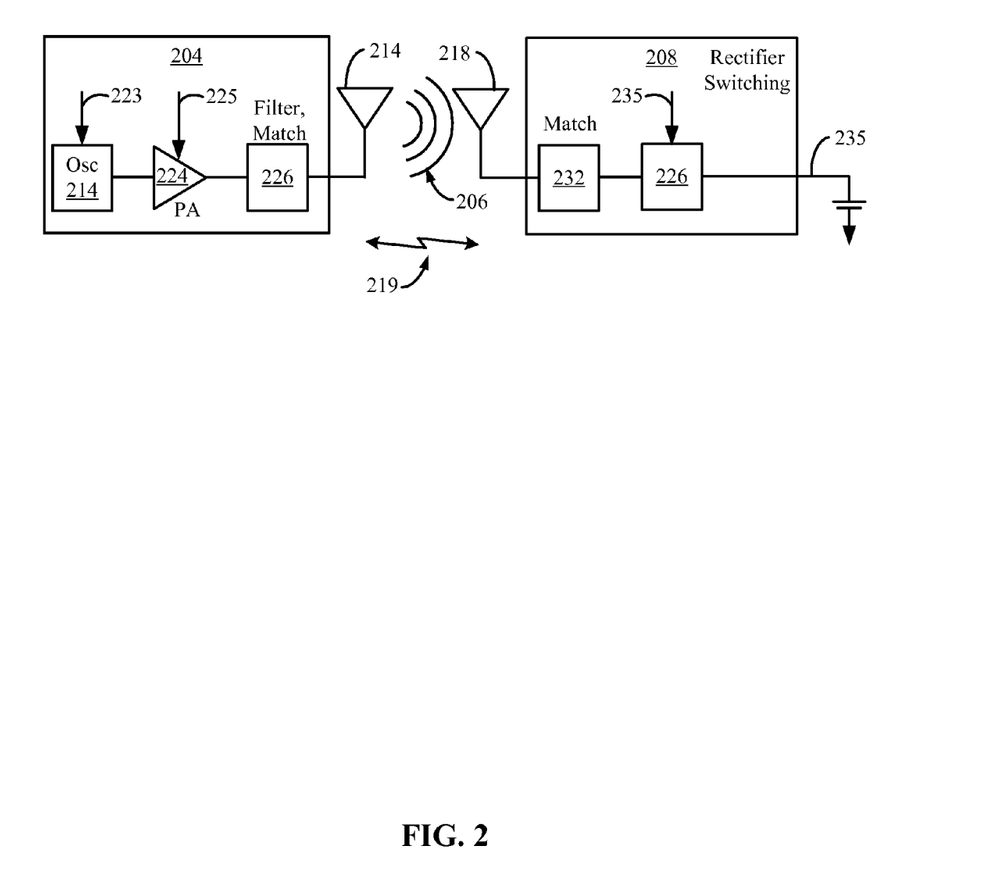
FIG. 2 illustrates a simplified schematic diagram of a near field communication transfer system according to an aspect.

FIG. 2 shows a simplified schematic diagram of a near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

Figure 3:
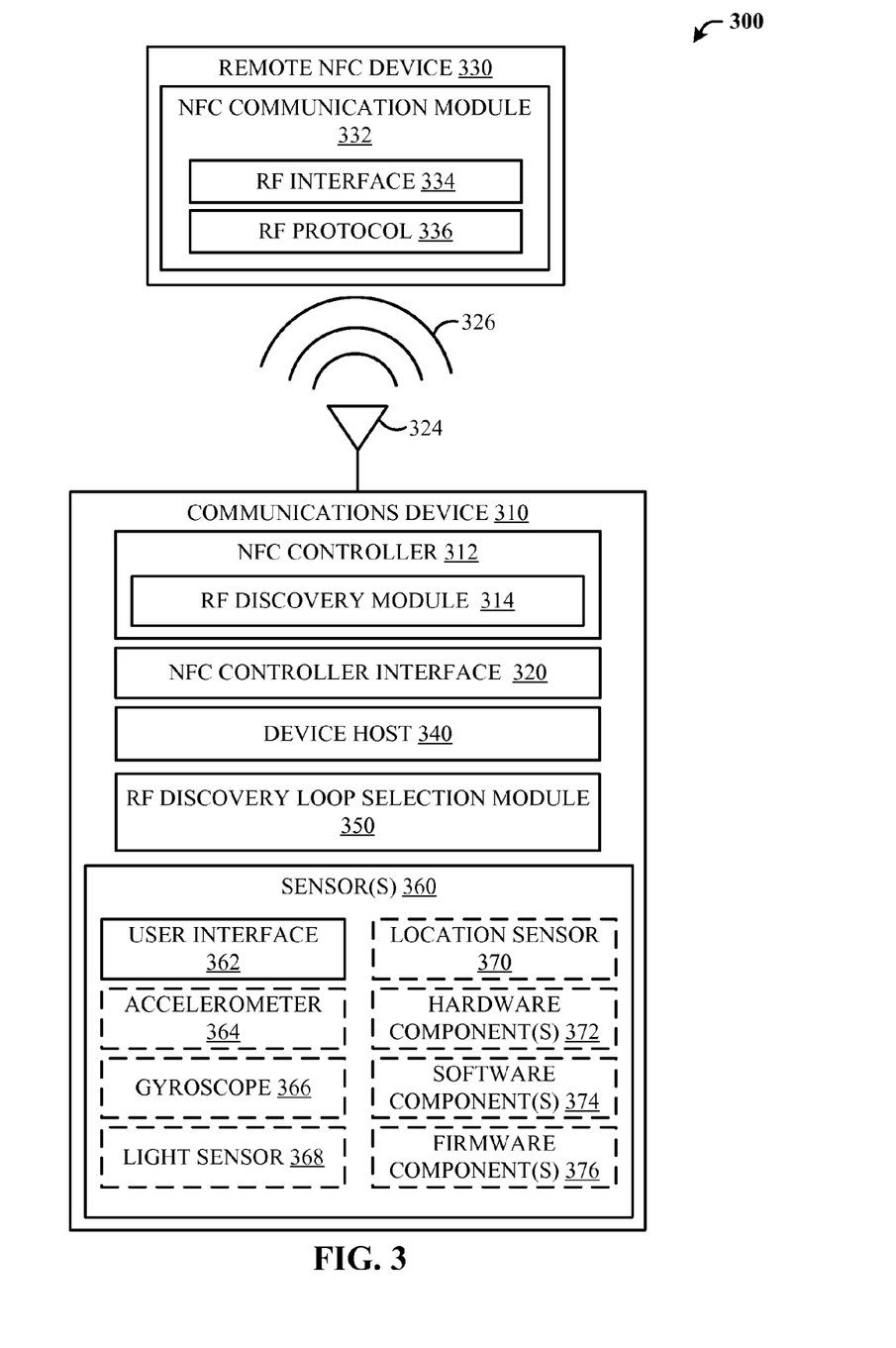
FIG. 3 illustrates a block diagram of a NFC environment according to an aspect.

With reference to FIG. 3, a block diagram of a communication network 300 according to an aspect is illustrated. Communication network 300 may include communications devices 310 which, through antenna 324, may be in communication with a remote NFC device 330 using one or more NFC technologies 326 (e.g., NFC-A, NFC-B, NFC-F, etc.). In one aspect, remote NFC device 330 and/or communications device 310 may be operable to communicate through NFC communication module 332 through one or more RF interfaces 334 using one or more RF protocols 336. In another aspect, communications device 310 may be operable to be connected to an access network and/or core network (e.g., a CDMA network, a GPRS network, a UMTS network, and other types of wireline and wireless communication networks). In one aspect, remote NFC device 330 may include but is not limited to a remote NFC tag, a reader/writer device, a peer initiator device, a remote peer target device, a card emulator, etc.

Communications device 310 may include NCI 320. In one aspect, NCI 320 may be operable to enable communications between a NFC enabled antenna 324 and NFC controller 312.

Communications device 310 may include a NFC controller (NFCC) 312. In one aspect, NFCC 312 may include RF discovery module 314. RF discovery module 314 may be operable to perform RF discovery using a RF discovery loop as part of a discovery process to enable NFC communications. DH 340 may be operable to generate a command to prompt NFCC 312 to perform various functions associated with RF discovery.

Communications device 310 may include RF discovery loop selection module 350. RF discovery loop selection module 350 may be operable to select a RF discovery loop to use during the RF discovery process. As used herein, a RF discovery loop may refer to a time duration that includes one or more sub-durations allocated for at least one of listening mode and/or for polling mode operations during a NFC RF discovery process. In one aspect, the RF discovery loop may be selected from one or more RF discovery loop options store on communications device 310. In another aspect, RF discovery loop selection module 350 may select an RF discovery loop based an obtained informational value. In one aspect, RF discovery loop selection module 350 may obtain the informational value as a measurement from one or more sensors 360. In one aspect, the sensors 360 may include a user interface 362.

In another aspect, the sensors 360 may optionally include any combination of an accelerometer 364, a gyroscope 366, a light sensor 368, a location sensor 370, one or more hardware components 372, one or more software components 374, one or more firmware components 376, etc. For example, where the sensor 360 is an accelerometer 364, the informational value may include a value indicating that the communications device 310 has just been picked up, and RF discovery loop selection module 350 may select a RF discovery loop that allots comparatively more time to polling than was allotted prior to the determination of motion. In another example, where the sensor 360 is a gyroscope 366, the information value may indicate that the device is being held in an orientation that is substantially perpendicular to the ground, and RF discovery loop selection module 350 may select a RF discovery loop that allots comparatively more time to polling, and/or comparatively more time to NFC RF technologies used by smart posters, peer devices, etc. In another example, where the sensor 360 is a light sensor 368, the informational value may be a light value below a threshold (e.g. indicating that the communications device 310 is in a user's pocket, purse, etc.), and the RF discovery loop selection module 350 may select a RF discovery loop that allots comparatively more time to listening (e.g., a lower power consuming mode). In another example, where the sensor 360 is a location sensor 370, the informational value may be a geographical location (e.g., GPS, cellular base station triangulation, cellular or WiFi network information, etc.), and RF discovery loop selection module 350 may select a RF discovery loop based on NFC action that the communications device 310 may have performed when within a threshold distance of the geographical location. In another example, where the sensor 360 includes one or more hardware components 372, the informational value may be information accessed from a memory module associated with the communications device, and RF discovery loop selection module 350 may select an RF discovery loop based on what NFC actions were performed when the information was previously accessed from the memory. In another example, where the sensor includes one or more software components (e.g., applications), the informational value may include a value may available by an application, a value communicated between applications, etc., and RF discovery loop selection module 350 may select a RF discovery loop prompted by the application provided value. In another example, where the sensor 360 includes one or more firmware components 376 (e.g., a SIM card, etc.), the informational value may be user profile information accessible through the firmware component 376, and RF discovery loop selection module 350 may select a RF discovery loop that the SIM card indicates the user has a preference towards.

Therefore, a system and method is disclosed to provide improved RF discovery loop selection based one analysis of measurements obtained from one or more sensors 360.

Figure 4:
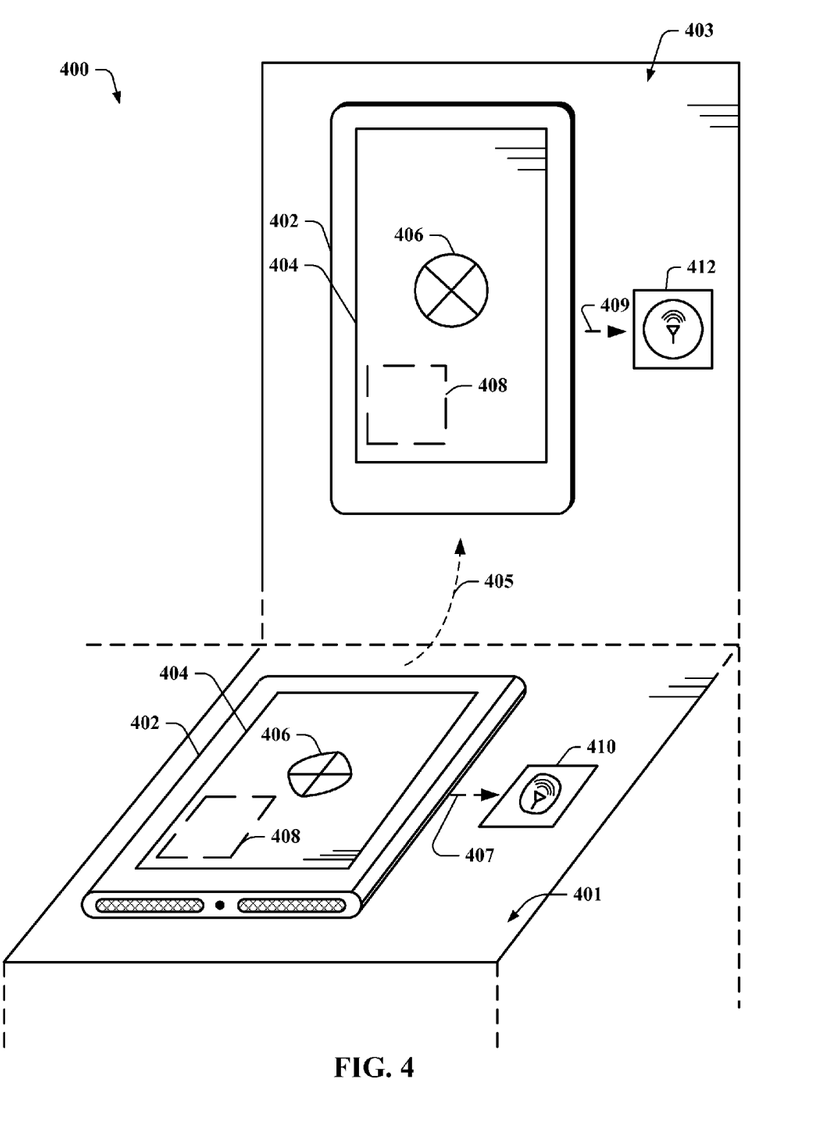
FIG. 4 illustrates a block diagram of another NFC environment according to an aspect.

With reference to FIG. 4, a block diagram of a communication environment 400 according to an aspect is illustrated. Communication environment 400 may include a communications device 402 operable to perform NFC communications. In the depicted aspect, communications environment 400 may include multiple surfaces 401, 403 that may include remote NFC endpoints 410, 412. In one aspect, the remote NFC endpoints 410, 412 may include, but are not limited to, a remote NFC tag, a reader/writer device, a peer initiator device, a remote peer target device, a card emulator, etc.

Communications device 402 may include a user interface 404, a NFC module 406, and one or more sensors 408. In an optional aspect, the location of the NFC module 406 may be indicated on the user interface 404.

In an operational aspect, communications device 402 may obtain an informational value from the one or more sensors 408 to assist in determining which RF discovery loop to select attempt to optimize NFC connection performance without resulting in excessive power consumption. In the depicted aspect, communications device 402 sensor 408 may be operable to determine that the communications device 402 is substantially parallel to surface 401. Such a determination may prompt communications device 402 to select a first RF discovery loop in anticipation of attempted NFC communications 407 with remote NFC endpoint 410.

Continuing the operational aspect description, the communications device 402 may be moved 405 to a different location. In the depicted aspect, communications device 402 sensor 408 may be operable to determine that the communications device 402 is substantially parallel to surface 403. Such a determination may prompt communications device 402 to select a second RF discovery loop in anticipation of attempted NFC communications 409 with remote NFC endpoint 412.

Therefore, an example communications environment 400 is disclosed in which a communications device 402 may use measurements obtained from one or more sensors 408 to select a RF discovery loop for communications with various remote NFC endpoints 410, 412.

Figure 5:
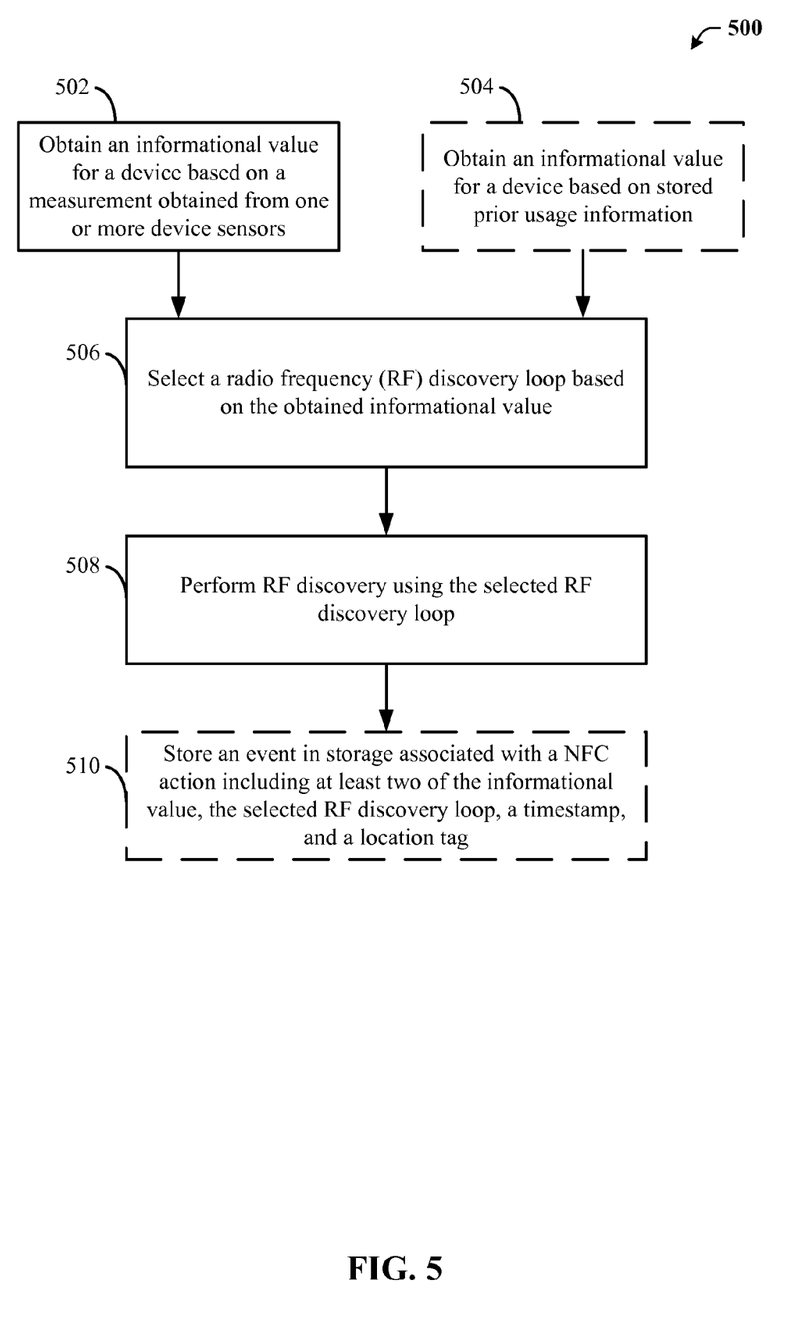
FIG. 5 illustrates a flowchart describing an example system for improving RF discovery loop selection based on one or more device sensor values, according to an aspect.

FIG. 5 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 5 illustrates an example process 500 for modifying polling and listening configurations of an RF discovery loop based, at least in part, on one or more measurements obtained from one or more device sensors. Communications process 500 allows past user behavior to influence the configuration of the RF Discovery loop. Further, implementation of process 500 may tune RF Discovery parameters to reduce power consumption, while minimizing the impact on, or in certain cases improving, the user experience. In other words, analysis of historical data may show that the user is more likely to attempt to make a connection to a remote NFC endpoint when similar patterns are detected again. In such an occurrence, the device may increase the frequency of polling, or increase a portion of time for listening, and/or both. This may result in the user experiencing faster connection times when an NFC operation is potentially requested. Similarly, where analysis of historical data shows that a user is less likely to attempt to make an NFC connection, the device may reduce polling and/or listening. This may result in lower power consumption during these times. In another aspect, historical data may be analyzed to determine the nature of use of the device (e.g., connection with a reader/writer, a card emulator, a peer to peer device, etc.). The previously usage information can be used to differentiate between increasing polling and increased listening.

At block 502, a device may obtain an information value based on a measurement obtained from one or more device sensors. As used herein, an informational value may include a wide variety of values. By way of example and not limitation, an informational value may include, a time of day, day of week, location, one or more accelerometer values, a timestamp value, device orientation, device location, etc.

In an optional aspect, at block 504, a device may obtain an information value based on analysis of one or more prior NFC actions. In such an optional aspect, the prior NFC action may be stored as an event with additional contextual information. For example, when a user successfully performs a NFC action, information such as, but not limited to, the user's location, the NFC RF technology used for the NFC action, the RF discovery loop used for the NFC action, the device orientation, etc., may be stored in memory on the device. Thereafter, the device may obtain contextual information that may be associated with the stored information.

At block 506, the device may select a RF discovery loop based on the obtained informational value. In one aspect, the informational value may be obtained from sensor measurements, as described in block 502. In an optional aspect, the informational value may be obtained from stored prior usage information, as described in block 504. In another optional aspect, the informational value may be obtained from both sensor measurements and stored prior usage information. In one aspect, where the informational value indicates that a user interacts with a point of sale terminal at a given location, the RF discovery loop may be selected to reduce polling and increase listening in order to give the best chance of being activated by the reader. Additionally or in the alternative, if the device determines that a user interacts with a tag at a given location, for example by reading a tag to indicate getting on or off a train, the RF discovery loop may be selected to increase polling, decrease listening, or both in order to minimize the time taken to activate the tag.

For example, wherein the informational value is a time of day value, it is likely that there will be periods of several hours a day in which the user is asleep, and according the probability of connection attempts that may be useful to the user may be low. In such a situation, the NFC device may re-tune the RF Discovery polling and listening parameters to reduce the current consumption.

In another example, where the informational value is a current time, evaluating stored time-stamped NFC activity, may indicate that the user takes a train to work on weekdays, and thus attempts to pass a transit access point at relatively narrow time windows during the morning and evening of Monday to Friday. As such, a RF discovery loop may be selected in order to give the optimal balance between power consumption and user experience. For example, if the access gates most commonly encountered by the user are of the reader/writer type the probability parameter could decrease polling, increase listening, and/or both. On the other hand if the gates encountered are mostly of the tag type, the probability parameter could increase polling, decrease listening, and/or both.

In still another example the informational value may be a current location. Many NFC items of interest to a user may have fixed locations, such as smart posters, mass transit access tags, and point of sale terminals. As such, the current location information may be associated with one or more stored events that indicate that a device is returning to a point where NFC has been used before, and this information may be used to determine the a RF discovery loop that increases the amount of polling, listening, or both. Further, the nature of the NFC use may be tracked (e.g., reader/writer, card emulation, peer to peer communications, etc.) at a given location and the RF discovery loop may be selected for the optimal balance between power consumption and user experience.

In another example, the informational value may be a current orientation of the device, where certain orientations of a NFC device are most commonly associated with a given type of NFC operation, and a RF discovery loop may be for optimal interactions with a reader/writer, card emulator, a peer device, etc. For example, if the device determines that a given angle of orientation is commonly used when interacting with a point of sale terminal, a RF discovery loop may be selected associated with the angle of orientation to reduce polling, increase listening, or both, and configure RF Discovery for the optimal balance between power consumption and user experience. Additionally, or in the alternative, if a device determines that smart posters or mass transit access tags accessed by the user are commonly accessed with the device in a vertical orientation, a RF discovery loop may be selected associated with the angle of orientation to increase polling, decrease listening, or both in order to minimize the time taken to activate the tag. In one aspect, multiple informational values may be associated with an event. For example, both location and time of day may be stored and with associated with a prior NFC usage.

At block 508, the device may perform discovery using the selected RF discovery loop. In an optional aspect, at block 510, the NFC device may store an event associated with a NFC action including at least two of: the informational value, the selected RF discovery loop, a timestamp, a location tag, etc. In one aspect, the stored event information may be used to assist potential future use, such as described with reference to optional block 504. In one aspect, where the stored event includes a time stamp, the event may be removed from the NFC device storage after a threshold time duration.

Figure 6:
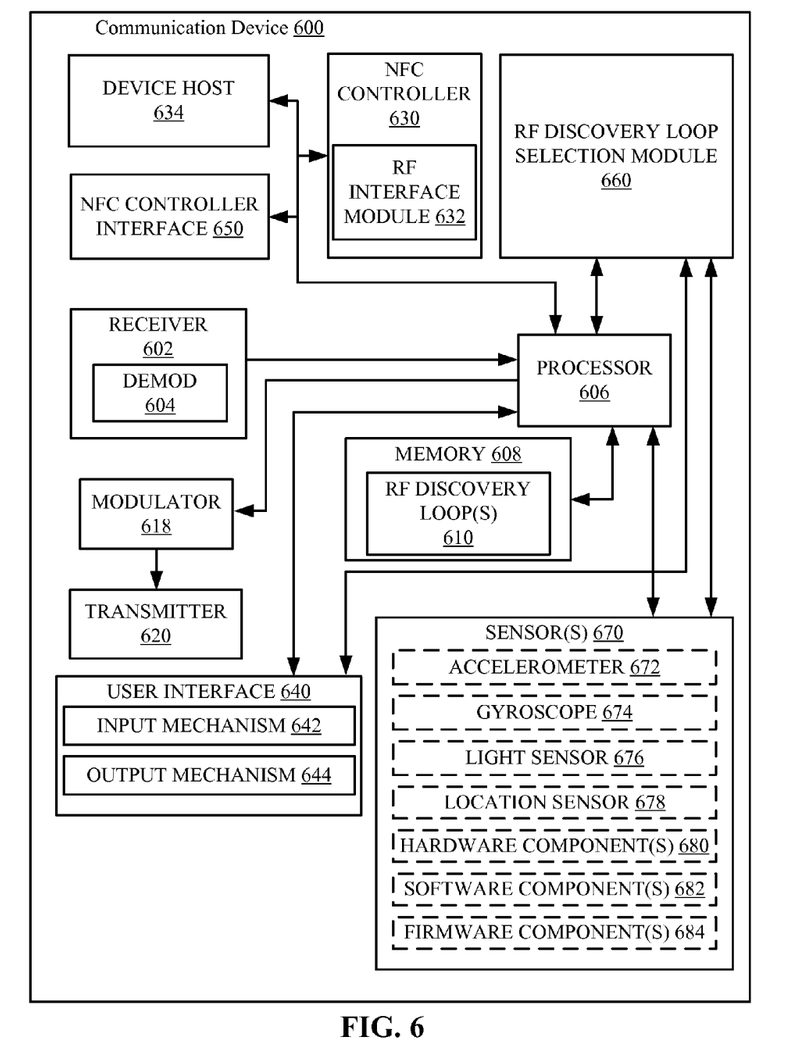
FIG. 6 illustrates a block diagram example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC peer mode connection establishment. In one aspect, memory 608 may include one or more RF discovery loops 610. In one aspect, each RF discovery loop 610 stored on the communications device 600 may be defined by a different first duration and second duration. In another aspect, each RF discovery loop 610 stored on the communications device 600 may be defined by a different frequency of occurrence for the first duration and for the second duration. In still another aspect, each RF discovery loop 610 stored on communications device 600 may be defined by a different frequency at which each NFC RF technology may be polled/listened for.

Further, processor 606, device host 634, NFCC 630, and/or RF discovery loop selection module 660 can provide means for obtaining an informational value for a device based on a measurement obtained from one or more device sensors, means for selecting a RF discovery loop based on the obtained informational value, and means for performing RF discovery using the selected RF discovery loop.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Device 600 may include a NFC controller 630. In one aspect, NFCC 630 may include RF interface module 632. RF interface module 632 may be operable to perform RF discovery using a RF discovery loop (e.g., 610) as part of a discovery process to enable NFC communications.

In another aspect, communications device 600 may include NCI 650. In one aspect, NCI 650 may be operable to enable communications between a NFC enabled antenna (e.g., 602, 620), NFC controller 630 and device host 634. NCI 650 may be operable to function in a listening mode and/or a polling mode.

In another aspect, communications device 600 may include RF discovery loop selection module 660. RF discovery loop selection module 660 may be operable to select a RF discovery loop to use during the RF discovery process. As used herein, a RF discovery loop may refer to a time duration that includes one or more sub-durations allocated for at least one of listening mode and/or for polling mode operations during a NFC RF discovery process. In one aspect, the RF discovery loop may be selected from one or more RF discovery loops 610 store in communications device 600 memory 608. In another aspect, RF discovery loop selection module 660 may select an RF discovery loop based an obtained informational value. In one aspect, RF discovery loop selection module 660 may obtain the informational value as a measurement from a user interface 640, one or more sensors 670, etc. In one aspect, the sensors 670 may optionally include any combination of an accelerometer 672, a gyroscope 674, a light sensor 676, a location sensor 678, one or more hardware components 680, one or more software components 682, one or more firmware components 684, etc. In another aspect, RF discovery loop selection module 660 may be operable to perform RF discovery processes described with respect to FIG. 5.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display operable to present media content that is in image or video format or an audio speaker to present media content that is in an audio format.

Figure 7:
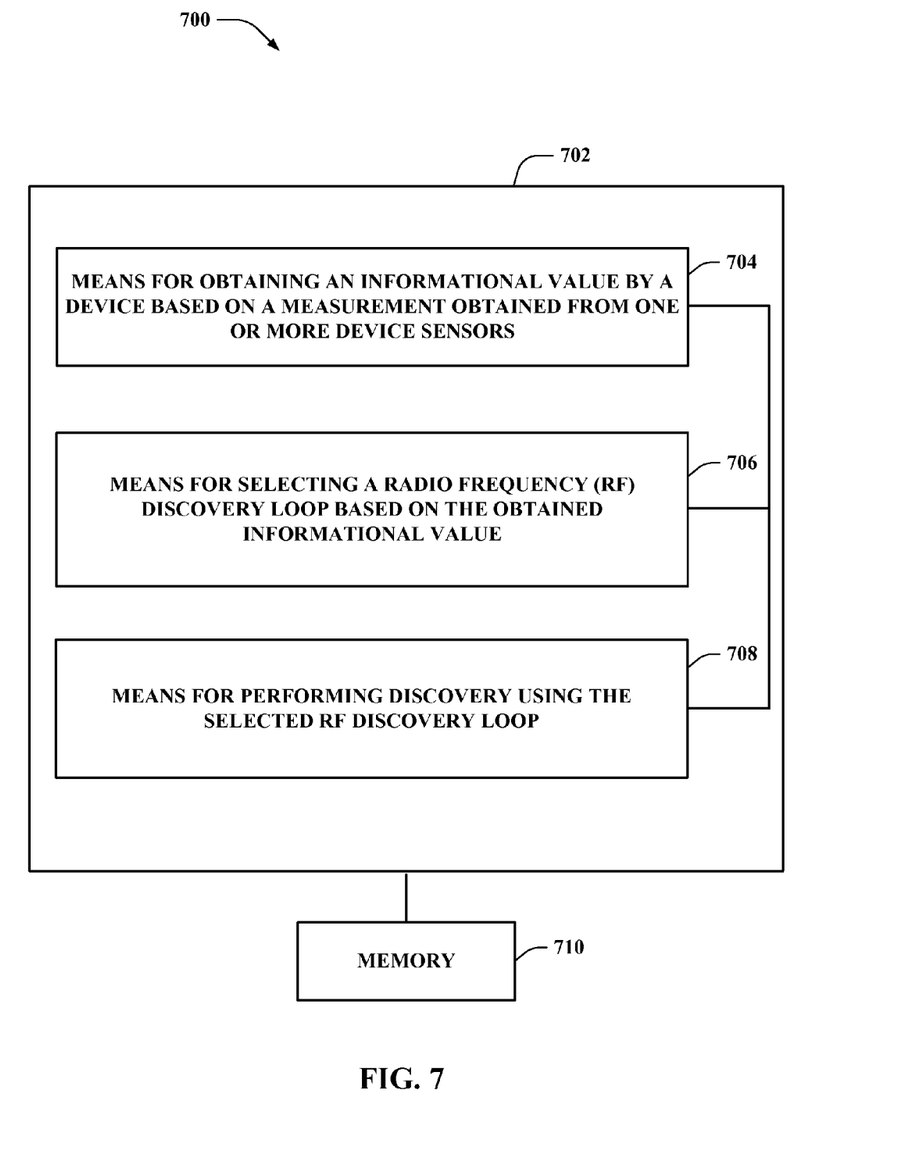
FIG. 7 illustrates a block diagram of an example communication system for improving RF discovery loop selection based on one or more device sensor values, according to an aspect.

FIG. 7 depicts another depicts a block diagram of an exemplary communication system 700 operable to provide improved selection of a NFC RF discovery loop based on one or more measurements obtained from one or more sensors associated with a NFC device, according to an aspect. For example, system 700 can reside at least partially within a communications device (e.g., communications device 600). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include an electrical component that may provide means for obtaining an informational value for a device based on a measurement obtained from one or more device sensors 704. In one aspect, the informational value may include values such as but not limited to, a user input, device location information, device orientation information, device motion information, power consumption information, etc. In one aspect, the one or more device sensors may include a user interface, a location sensor, a gyroscope, an accelerometer, a light sensor, an auditory input, etc. In another aspect, the means for obtaining may further include means or obtaining a second information value based on a second measurement obtained from the one or more device sensors.

Further, logical grouping 702 can include an electrical component that may provide means for selecting a RF discovery loop based on the obtained informational value 706. In one aspect, where the informational value is a time of day, the logical grouping may provide means for selecting a RF discovery loop from a plurality of RF discovery loops that is associated with the time of day. In another aspect, where the informational value is a day of the week, the logical grouping may provide means for selecting the RF discovery loop that is also associated with the day of the week. In another aspect, where the informational value is a location, the logical grouping may provide means for selecting a RF discovery loop that is also associated with the location. In another aspect, where the informational value is one or more values from an accelerometer associated with the NFC device, the logical group may provide means for inferring a user action from the one or more values from the accelerometer, and means for selecting a RF discovery loop that is associated with the inferred action. In another aspect, where the informational value is one or more values from a gyroscope associated with the NFC device, the logical group may provide means for inferring a user action from the one or more values from the gyroscope, and means for selecting a RF discovery loop that is associated with the inferred action. In such an aspect, the logical group may further provide means for determining that the device is oriented either substantially horizontal or substantially vertical in comparison with a ground level, and means for selecting either a first RF discovery loop or a second RF discovery loop based on whether the device orientation is determined to be substantially horizontal or substantially vertical in comparison with the ground level. In another aspect, the logical group may provides means for selecting the RF discovery loop in which more time is allocated for either the listening mode or the polling mode. In another aspect, the logical group may provide means for selecting the RF discovery loop by balancing improvement in power consumption with potential delay in RF discovery. In such an aspect, a factor that may be used in the balancing is the obtained informational value. In one aspect, the logical grouping may provide means for selecting based on a probability that the device will be used for at least one of: a reader/writer, a card emulation, or peer to peer communications. In one aspect, in which multiple informational values have been obtained, the logical group may provide means for determining a first priority value associated with the informational value and a second priority value associated with the second informational value, and means for selecting the RF discovery loop associated a higher priority value between the first priority value and the second priority value.

Moreover, logical grouping 702 can include an electrical component that may provide means for performing RF discovery using the selected RF discovery loop 708. Further, in an optional aspect, logical grouping 702 can include an electrical component that may provide means for storing an event in device storage that may include content such as, but not limited to the informational value, the selected RF discovery loop, a timestamp, a location tag, etc. In such an optional aspect, where the stored event includes a timestamp, the logical grouping may include an electrical component that may provide means for removing the event from the storage after a threshold time has elapsed. For example, a stored event may be removed from storage after a week, a month, etc.

Additionally, system 700 can include a memory 710 that retains instructions for executing functions associated with the electrical components 704, 706, and 708, stores data used or obtained by the electrical components 704, 706, 708, etc. While shown as being external to memory 710, it is to be understood that one or more of the electrical components 704, 706, and 708 may exist within memory 710. In one example, electrical components 704, 706, and 708 can include at least one processor, or each electrical component 704, 706, and 708 can be a corresponding module of at least one processor. Moreover, in an additional or alternative example, electrical components 704, 706, and 708 may be a computer program product including a computer readable medium, where each electrical component 704, 706, and 708 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC, -f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
obtaining an informational value for a device based on a measurement obtained from one or more device sensors;
selecting, from a plurality of radio frequency (RF) discovery loops having different mode duration allocations and stored on the device, a RF discovery loop based on the obtained informational value; and
performing RF discovery using the selected RF discovery loop.

2. The method of claim 1, wherein the informational value is a time of day; and
wherein the selecting further comprises selecting a RF discovery loop that is associated with the time of day.

3. The method of claim 2, wherein the informational value is a day of the week; and
wherein the selecting the RF discovery loop further comprises selecting the RF discovery loop that is also associated with the day of the week.

4. The method of claim 1, wherein the informational value is a location; and
wherein the selecting further comprises selecting a RF discovery loop that is associated with the location.

5. The method of claim 1, wherein the informational value comprises one or more values from an accelerometer associated with the device; and
wherein the selecting further comprises:
inferring a user action from the one or more values from the accelerometer; and
selecting a RF discovery loop that is associated with the inferred action.

6. The method of claim 1, wherein the informational value comprises one or more values a from a gyroscope associated with the device; and
wherein the selecting further comprises:
inferring a user action from the one or more values from the gyroscope; and
selecting a RF discovery loop that is associated with the inferred action.

7. The method of claim 6, wherein the analyzing further comprises determining that the device is oriented either substantially horizontal or substantially vertical in comparison with a ground level; and
wherein the selecting the RF discovery loop further comprises selecting either a first RF discovery loop or a second RF discovery loop from the plurality of RF discovery loops based on whether the device orientation is determined to be substantially horizontal or substantially vertical in comparison with the ground level.

8. The method of claim 1, further comprising storing an event in storage associated with the device, wherein the event includes at least two of:
the informational value, the selected RF discovery loop, a timestamp, and a location tag.

9. The method of claim 8, wherein the stored event includes the timestamp, and further comprising removing the event from the storage after a threshold time has elapsed.

10. The method of claim 1, wherein the RF discovery loop defines durations allocated for a listening mode and for a polling mode, and wherein the selecting further comprises selecting the RF discovery loop in which more time is allocated for either the listening mode or the polling mode.

11. The method of claim 1, wherein the selecting further comprises selecting the RF discovery loop by balancing improvement in power consumption with potential delay in RF discovery, wherein a factor used in the balancing is the obtained informational value.

12. The method of claim 1, wherein the selecting is based on a probability that the device will be used for at least one of: a reader/writer, a card emulation, or peer to peer communications.

13. The method of claim 1, wherein the informational value includes at least one of:
user input;
device location;
device orientation;
device motion; or
history of device power consumption.

14. The method of claim 1, wherein the one or more device sensors includes at least one of:
a user interface;
a location sensor;
a gyroscope;
an accelerometer;
a light sensor; or
an auditory input.

15. The method of claim 1, further comprising:
obtaining a second informational value for the device based on a second measurement obtained from the one or more device sensors; and
wherein the selecting further comprises:
determining a first priority value associated with the informational value and a second priority value associated with the second informational value; and
selecting a RF discovery loop associated a comparatively greater priority value between the first priority value and the second priority value.

16. A computer program product, comprising:
a non-transitory computer-readable medium comprising code for:
obtaining an informational value for a device based on a measurement obtained from one or more device sensors;
selecting, from a plurality of radio frequency (RF) discovery loops having different mode duration allocations and stored on the device, a RF discovery loop based on the obtained informational value; and
performing RF discovery using the selected RF discovery loop.

17. The computer program product of claim 16, wherein the informational value is a time of day; and
wherein the code for selecting further comprises code for selecting a RF discovery loop that is associated with the time of day.

18. The computer program product of claim 17, wherein the informational value is a day of the week; and
wherein the code for selecting a RF discovery loop further comprises code for selecting the RF discovery loop that is also associated with the day of the week.

19. The computer program product of claim 16, wherein the informational value is a location; and
wherein the code for selecting further comprises code for selecting the RF discovery loop that is associated with the location.

20. The computer program product of claim 16, wherein the informational value comprises one or more values from an accelerometer associated with the device; and
wherein the code for selecting further comprises code for:
inferring a user action from the one or more values from the accelerometer; and
selecting the RF discovery loop that is associated with the inferred action.

21. The computer program product of claim 16, wherein the informational value comprises one or more values a from a gyroscope associated with the device; and
wherein the code for selecting further comprises code for:
inferring a user action from the one or more values from the gyroscope; and
selecting a RF discovery loop that is associated with the inferred action.

22. The computer program product of claim 21, wherein the code for analyzing further comprises code for determining that the device is oriented either substantially horizontal or substantially vertical in comparison with a ground level; and
wherein the code for selecting the RF discovery loop further comprises code for selecting either a first RF discovery loop or a second RF discovery loop from the plurality of RF discovery loops based on whether the device orientation is determined to be substantially horizontal or substantially vertical in comparison with the ground level.

23. The computer program product of claim 16, further comprising code for storing an event in storage associated with the device, wherein the event includes at least two of:
the informational value, the selected RF discovery loop, a timestamp, and a location tag.

24. The computer program product of claim 23, wherein the stored event includes the timestamp, and further comprising code for removing the event from the storage after a threshold time has elapsed.

25. The computer program product of claim 16, wherein the RF discovery loop defines durations allocated for a listening mode and for a polling mode, and wherein the code for selecting further comprises code for selecting the RF discovery loop in which more time is allocated for either the listening mode or the polling mode.

26. The computer program product of claim 16, wherein the code for selecting further comprises code for selecting the RF discovery loop by balancing improvement in power consumption with potential delay in RF discovery, wherein a factor used in the balancing is the obtained informational value.

27. The computer program product of claim 16, wherein the code for selecting is based on a probability that the device will be used for at least one of: a reader/writer, a card emulation, or peer to peer communications.

28. The computer program product of claim 16, wherein the informational value includes at least one of:
user input;
device location;
device orientation;
device motion; or
history of device power consumption.

29. The computer program product of claim 16, wherein the one or more device sensors includes at least one of:
- a user interface;
- a location sensor;
- a gyroscope;
- an accelerometer;
- a light sensor; or
- an auditory input.

30. The computer program product of claim 16, further comprising code for:
- obtaining a second informational value for the device based on a second measurement obtained from the one or more device sensors; and
- wherein the code for selecting further comprises code for:
  - determining a first priority value associated with the informational value and a second priority value associated with the second informational value; and
  - selecting a RF discovery loop associated a higher priority value between the first priority value and the second priority value.

31. An apparatus for communications, comprising:
- means for obtaining an informational value for a device based on a measurement obtained from one or more device sensors;
- means for selecting, from a plurality of radio frequency (RF) discovery loops having different mode duration allocations and stored on the device, a RF discovery loop based on the obtained informational value; and
- means for performing RF discovery using the selected RF discovery loop.

32. The apparatus of claim 31, wherein the informational value is a time of day; and
- wherein the means for selecting further comprises means for selecting a RF discovery loop that is associated with the time of day.

33. The apparatus of claim 32, wherein the informational value is a day of the week; and
- wherein the means for selecting a RF discovery loop further comprises means for selecting the RF discovery loop that is also associated with the day of the week.

34. The apparatus of claim 31, wherein the informational value is a location; and
- wherein the means for selecting further comprises means for selecting the RF discovery loop that is associated with the location.

35. The apparatus of claim 31, wherein the informational value comprises one or more values from an accelerometer associated with the device; and
- wherein the means for selecting further comprises:
  - means for inferring a user action from the one or more values from the accelerometer; and
  - means for selecting a RF discovery loop that is associated with the inferred action.

36. The apparatus of claim 31, wherein the informational value comprises one or more values a from a gyroscope associated with the device; and
- wherein the means for selecting further comprises:
  - means for inferring a user action from the one or more values from the gyroscope; and
  - means for selecting a RF discovery loop that is associated with the inferred action.

37. The apparatus of claim 36, wherein the means for analyzing further comprises means for determining that the device is oriented either substantially horizontal or substantially vertical in comparison with a ground level; and
- wherein the means for selecting the RF discovery loop further comprises means for selecting either a first RF discovery loop or a second RF discovery loop from the plurality of RF discovery loops based on whether the device orientation is determined to be substantially horizontal or substantially vertical in comparison with the ground level.

38. The apparatus of claim 31, further comprising means for storing an event in storage associated with the device, wherein the event includes at least two of:
- the informational value, the selected RF discovery loop, a timestamp, and a location tag.

39. The apparatus of claim 38, wherein the stored event includes the timestamp, and further comprising means for removing the event from the storage after a threshold time has elapsed.

40. The apparatus of claim 31, wherein the RF discovery loop defines durations allocated for a listening mode and for a polling mode, and wherein the means for selecting further comprises means for selecting the RF discovery loop in which more time is allocated for either the listening mode or the polling mode.

41. The apparatus of claim 31, wherein the means for selecting further comprises means for selecting the RF discovery loop by balancing improvement in power consumption with potential delay in RF discovery, wherein a factor used in the balancing is the obtained informational value.

42. The apparatus of claim 31, wherein the means for selecting is based on a probability that the device will be used for at least one of: a reader/writer, a card emulation, or peer to peer communications.

43. The apparatus of claim 31, wherein the informational value includes at least one of:
- user input;
- device location;
- device orientation;
- device motion; or
- history of device power consumption.

44. The apparatus of claim 31, wherein the one or more device sensors includes at least one of:
- a user interface;
- a location sensor;
- a gyroscope;
- an accelerometer;
- a light sensor; or
- an auditory input.

45. The apparatus of claim 31, further comprising:
- means for obtaining a second informational value for the device based on a second measurement obtained from the one or more device sensors; and
- wherein the means for selecting further comprises:
  - means for determining a first priority value associated with the informational value and a second priority value associated with the second informational value; and
  - means for selecting a RF discovery loop associated a higher priority value between the first priority value and the second priority value.

46. A near field communication (NFC) device for communications, comprising:
- one or more device sensors;
- a memory;
- a processor coupled to the memory; and
- a radio frequency (RF) discovery loop selection module coupled to at least one of the memory, the processor, or the one or sensors and configured to:
  - obtain an informational value for the NFC device based on a measurement obtained from the one or more device sensors;

select, from a plurality of RF discovery loops having different mode duration allocations and stored on the NFC device, a RF discovery loop based on the obtained informational value; and perform RF discovery using the selected RF discovery loop.

47. The NFC device of claim 46, wherein the informational value is a time of day; and
wherein the RF discovery loop selection module is further configured to select a RF discovery loop that is associated with the time of day.

48. The NFC device of claim 47, wherein the informational value is a day of the week; and
wherein the RF discovery loop selection module is further configured to select the RF discovery loop that is also associated with the day of the week.

49. The NFC device of claim 46, wherein the informational value is a location; and
wherein the RF discovery loop selection module is further configured to select a RF discovery loop that is associated with the location.

50. The NFC device of claim 46, wherein the informational value comprises one or more values from an accelerometer associated with the device; and
wherein the RF discovery loop selection module is further configured to:
infer a user action from the one or more values from the accelerometer; and
select a RF discovery loop that is associated with the inferred action.

51. The NFC device of claim 46, wherein the informational value comprises one or more values a from a gyroscope associated with the device; and
wherein the RF discovery loop selection module is further configured to:
infer a user action from the one or more values from the gyroscope; and
select a RF discovery loop that is associated with the inferred action.

52. The NFC device of claim 51, wherein the RF discovery loop selection module is further configured to:
determine that the device is oriented either substantially horizontal or substantially vertical in comparison with a ground level; and
select either a first RF discovery loop or a second RF discovery loop from the plurality of RF discovery loops based on whether the device orientation is determined to be substantially horizontal or substantially vertical in comparison with the ground level.

53. The NFC device of claim 46, wherein the RF discovery loop selection module is further configured to store an event in storage associated with the device, wherein the event includes at least two of:
the informational value, the selected RF discovery loop, a timestamp, and a location tag.

54. The NFC device of claim 53, wherein the stored event includes the timestamp, and wherein the RF discovery loop selection module is further configured to remove the event from the storage after a threshold time has elapsed.

55. The NFC device of claim 46, wherein the RF discovery loop defines durations allocated for a listening mode and for a polling mode, and wherein the RF discovery loop selection module is further configured to select the RF discovery loop in which more time is allocated for either the listening mode or the polling mode.

56. The NFC device of claim 46, wherein the RF discovery loop selection module is further configured to select the RF discovery loop by balancing improvement in power consumption with potential delay in RF discovery, wherein a factor used in the balancing is the obtained informational value.

57. The NFC device of claim 46, wherein the RF discovery loop selection module is further configured to select the RF discovery loop based on a probability that the device will be used for at least one of: a reader/writer, a card emulation, or peer to peer communications.

58. The NFC device of claim 46, wherein the informational value includes at least one of:
user input;
device location;
device orientation;
device motion; or
history of device power consumption.

59. The NFC device of claim 46, wherein the one or more device sensors includes at least one of:
a user interface;
a location sensor;
a gyroscope;
an accelerometer;
a light sensor; or
an auditory input.

60. The NFC device of claim 46, wherein the RF discovery loop selection module is further configured to:
obtain a second informational value for the NFC device based on a second measurement obtained from the one or more device sensors;
determine a first priority value associated with the informational value and a second priority value associated with the second informational value; and
select a RF discovery loop associated a higher priority value between the first priority value and the second priority value.

* * * * *